(12) United States Patent
Geng

(10) Patent No.: US 8,403,503 B1
(45) Date of Patent: Mar. 26, 2013

(54) FREEFORM OPTICAL DEVICE AND SHORT STANDOFF IMAGE PROJECTION

(76) Inventor: Zheng Jason Geng, Rockville, MD (US)

( * ) Notice: Subject to any disclaimer, the term of this patent is extended or adjusted under 35 U.S.C. 154(b) by 382 days.

(21) Appl. No.: 12/703,645

(22) Filed: Feb. 10, 2010

Related U.S. Application Data

(60) Provisional application No. 61/152,007, filed on Feb. 12, 2009.

(51) Int. Cl.
*G03B 21/28* (2006.01)

(52) U.S. Cl. ............... 353/98; 353/30; 353/31; 353/33; 353/37; 353/79; 353/99; 353/119; 359/618

(58) Field of Classification Search .......... 353/30, 353/31, 33, 37, 74–79, 98–99, 119; 359/364–366, 359/432, 434, 648–651, 798–801; 348/E5.143, 348/E9.027; 349/5, 7, 8, 9
See application file for complete search history.

(56) References Cited

U.S. PATENT DOCUMENTS

| | | | |
|---|---|---|---|
| 3,628,851 A | 12/1971 | Robertson | |
| 3,881,811 A | 5/1975 | French | |
| 4,258,979 A | 3/1981 | Mahin | |
| 4,449,786 A | 5/1984 | McCord | |
| 5,321,556 A | 6/1994 | Joe | |
| 6,064,423 A * | 5/2000 | Geng | 348/36 |
| 6,179,426 B1 | 1/2001 | Rodriguez, Jr. | |
| 6,439,729 B2 | 8/2002 | Koukichi | |
| 6,545,810 B1 * | 4/2003 | Takada et al. | 359/618 |
| 6,583,940 B2 * | 6/2003 | Nishikawa et al. | 359/738 |
| 6,779,897 B2 * | 8/2004 | Konno et al. | 353/99 |
| 7,520,641 B2 * | 4/2009 | Minano et al. | 362/297 |
| 7,562,987 B2 * | 7/2009 | McDowall | 353/78 |
| 7,591,560 B2 * | 9/2009 | Yamamoto | 353/99 |
| 7,967,448 B2 * | 6/2011 | Destain | 353/77 |
| 2003/0071891 A1 | 4/2003 | Geng | |
| 2003/0177164 A1 | 9/2003 | Savov et al. | |
| 2006/0139577 A1 * | 6/2006 | Ikeda et al. | 353/74 |
| 2006/0221309 A1 * | 10/2006 | Onishi et al. | 353/97 |
| 2008/0002158 A1 * | 1/2008 | Matsuoka | 353/77 |
| 2008/0030573 A1 | 2/2008 | Ritchey | |
| 2008/0223443 A1 | 9/2008 | Benitez et al. | |
| 2009/0225457 A1 | 9/2009 | Chuang | |
| 2010/0192941 A1 | 8/2010 | Stoia et al. | |
| 2011/0000538 A1 | 1/2011 | Rush | |

OTHER PUBLICATIONS

U.S. Appl. No. 12/650,187, filed Dec. 30, 2009; Zheng Jason Geng; office action issued Mar. 22, 2011.
U.S. Appl. No. 12/830,930; filed Jul. 6, 2010; Zheng Jason Geng; office action dated Nov. 8, 2012.
U.S. Appl. No. 12/871,498; filed Aug. 30, 2010; Zheng Jason Gheng; office action dated Dec. 7, 2012.

\* cited by examiner

*Primary Examiner* — Georgia Y Epps
*Assistant Examiner* — Sultan Chowdhury
(74) *Attorney, Agent, or Firm* — Thorpe North & Western LLP

(57) ABSTRACT

A freeform optical device is disclosed which has an at least partially curved surface with a surface geometry. Surface normals at multiple locations on the surface geometry can be computed to define the surface geometry with respect to multiple focal points corresponding to the surface normals at the locations in order to correct optical aberrations otherwise occurring at the focal points.

20 Claims, 17 Drawing Sheets

TYPE A

TYPE B

TYPE C

TYPE D

FREEFORM OPTICAL DEVICE AND SHORT STANDOFF IMAGE PROJECTION

PRIORITY CLAIM

This application claims the benefit of U.S. Provisional patent application Ser. No. 61/152,007 filed on Feb. 12, 2009 which is incorporated herein by reference in its entirety.

BACKGROUND

Until recently, a commonly used and fairly inexpensive device for small to medium sized image displays was the cathode-ray tube (CRT) monitor. However, as screen sizes increases with CRT monitors, the curvature of CRT screens also increases. In addition, the large size CRT monitors can become bulky and heavy. Energy consumption and electromagnetic radiation can also increase substantially with larger sized CRT monitors. These drawbacks have led to limited deployment in large size image display applications.

In recent years, flat panel display devices, such as liquid crystal display (LCD) and Plasma devices, have become increasingly popular. Flat panel displays can offer relatively thin packages (about 7.5~10 cm, for example) that can be placed directly on a wall. However, such devices can be heavy and require special mounts and strengthened wall structures to hang large size flat panel devices. The brightness of flat panel displays is normally low (~300 cd/m2 range) and the prices (usually measured by a ratio of $/diagonal length) are often high.

A high brightness alternative for large screen displays is a light emitting diode (LED) array device. In such a device a matrix of LEDs can form a large-size, bright, outdoor display. Although such devices can be attractive for applications such as outdoor advertisements, the LED arrays have a fixed (large) pixel size due to structural dimensions of the LEDs. These LED arrays are generally not suitable for indoor or portable presentation applications.

The above-mentioned display devices have pixel generation mechanisms built-in to the screens and are sometimes called "active screen" displays. Alternatives to "active screen" display devices include projection displays. Screens in projection displays are generally "passive", meaning that images generated on the screens originate from optical projection engines placed at a distance away from the screen. There are essentially two kinds of projection display designs: rear projection and frontal projection. Rear projection displays place the projection engine and viewers on the opposite side of the light transmitting screen. In contrast, the projection engine and viewers are located on the same side of a light reflective screen for frontal projection displays.

In traditional projection display system designs, whether rear projection or frontal projection, a certain amount of space is required to accommodate a light path of the image projection to be able to expand to a large screen size without any occlusion by any internal structures or external objects. In the case of rear-projection displays, mirrors are often used to fold optical projection paths to reduce the thickness of the display package. Despite folding optical paths, the enclosure of rear projection systems can still be large and bulky. The need for space behind the display screen can preclude use of such devices as wall-mounted displays.

For frontal projection displays, traditional optical designs still require long stand-off distance. With frontal projection systems, there is typically a large "forbidden zone" between a projector and the screen. Presenters or objects cannot enter this zone without occluding the projected image on the screen. In addition, entrance into this zone can subject a person to direct viewing of the bright light from the projector, which can cause temporary blindness or dizziness. The long stand-off distances required for typical frontal projection displays can prevent a presenter from getting close to the screen or interacting with images displayed on the screen. This drawback, among others, has prevented frontal projection displays from being used in many mass commercial applications, such as small office meetings, shop window advertisements, airplane/bus/train cabin displays, portable/mobile projection systems, video gaming, and virtual reality environments. In addition, frontal projection displays are often subject to image distortion, can require a large room in which to use the system, and be difficult to set up.

Certain advances have been made in extant technologies for reducing the standoff distance of projection displays. To date, most efforts toward reducing the standoff distance of projection displays have focused on the development wide field of view (FOV) optical lens systems. Such systems are often called "short throw lenses" which can achieve shorter standoff distances. The optical designs of short throw lenses are all based on traditional, rotationally-symmetric optics, similar to the design of a fish-eye lens. These lenses can be relatively easy to make and to model mathematically. The surface shape of a rotationally symmetric lens can be created from rotating a plane curve about a chosen line, which will serve as the optical axis of the lens or mirror. There are an infinite number of possible shape designs of rotationally symmetric lenses with different selections of plane curve shape and rotating axis. This design freedom can be used to achieve certain prescribed properties for an optical system.

Short throw lenses use rotationally symmetric optics designed to rapidly expand light beams to obtain shorter standoff distances. Short throw lenses feature a very short focal length which, when used as a primary projection optic or as an attachment to existing projection optics, enables a projector to generate a large size image over a much shorter distance. To achieve shorter standoff distances, short throw lenses typically consist of multiple lenses. Use of multistage lenses, however, can introduce strong optical aberrations, which in turn require additional lenses for correction. As a result, short throw lenses can be complex to build, bulky in size and weight, and expensive in cost. Current short throw lenses are not very suitable for compact display systems and often cost as much or more than the projector in which the lens is used. Short throw lenses also typically exhibit poor performance. In addition to causing optical aberrations, such lenses also can only reduce the standoff distance by approximately ⅓ to ½ of the original projection distance without the lens. For a projector with a 2~4 meter standoff distance, short through lenses may be able to reduce the distance maximally to 1~2 meters, which is still insufficient for many applications. Short throw lenses also discourage user interaction since the placement of a projector may still interfere with the line of sight of the viewers or the presenter due to the traditional optical design approaches and the still rather substantial standoff distance even with the reduction by the short throw lens.

SUMMARY OF THE INVENTION

The invention provides a freeform optical device. The optical device can include an at least partially curved surface having a surface geometry. Surface normals at multiple locations on the surface geometry can be computed to define the surface geometry with respect to multiple focal points corresponding to the surface normals at the locations in order to correct optical aberrations otherwise occurring at the focal points.

In another embodiment, an ultra-short standoff image projection system is described which includes a display screen and an image projector. The image projector can project an image onto the screen. The image projector can include a freeform optical lens. The optical lens can include an at least partially curved surface having a surface geometry. Surface normals at multiple locations on the surface geometry can be computed to define the surface geometry with respect to multiple focal points corresponding to the surface normals at the locations in order to correct optical aberrations otherwise occurring at the focal points.

In another embodiment, an ultra-short standoff image projection system is described which includes a display screen, an image projector configured to project image data, and a computed freeform mirror. The computer freeform mirror can reflect image data from the projector onto the screen. The freeform mirror can include an at least partially curved surface having a surface geometry. Surface normals at multiple locations on the surface geometry can be computed to define the surface geometry with respect to multiple points on the screen corresponding to the surface normals at the locations in order to correct optical aberrations otherwise occurring at the focal points.

In another embodiment, a process is described for projecting a short standoff image. A distance relationship between a display screen and a computed freeform optical device can be established. The computed freeform optical device can be positioned for passing image data from an image projector onto the display screen. The freeform optical device can include an at least partially curved surface having a surface geometry. Surface normals at multiple locations on the surface geometry can be computed to define the surface geometry with respect to multiple points on the screen corresponding to the surface normals at the locations in order to correct optical aberrations otherwise occurring at the focal points. The image can be projected onto the screen via the freeform optical device using the image projector.

DETAILED DESCRIPTION OF EXAMPLE EMBODIMENT(S)

Figure 1:
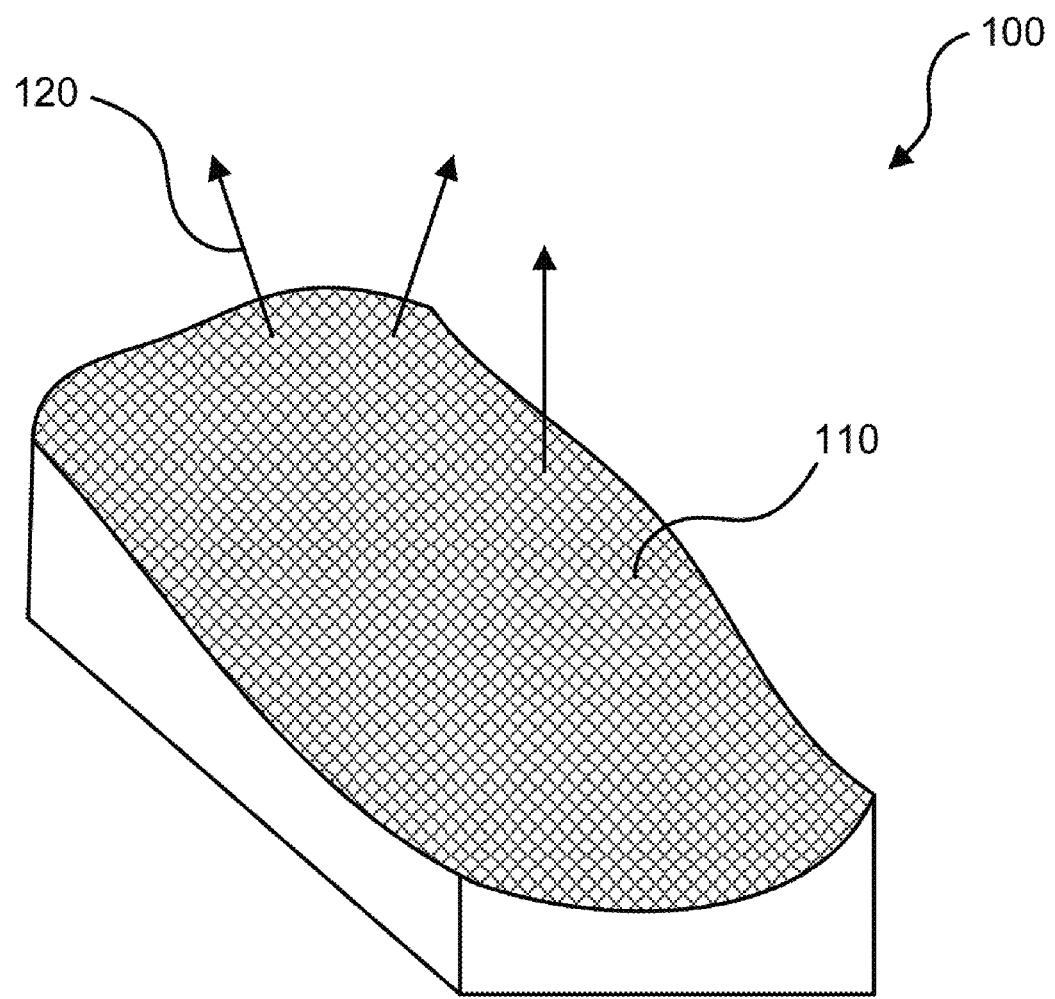
FIG. 1 is a perspective view of a freeform optical device in accordance with an embodiment of the present invention.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

In describing and claiming the present invention, the following terminology will be used in accordance with the definitions set forth below.

As used herein, "adjacent" refers to near or close sufficient to achieve a desired affect. Although direct physical contact is most common and preferred in the structures or volumes of the present invention, adjacent can broadly allow for spaced apart features.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect on the property of interest thereof.

As used herein, the term "about" is used to provide flexibility to a numerical range endpoint by providing that a given value may be "a little above" or "a little below" the endpoint with a degree of flexibility as would be generally recognized by those skilled in the art. Further, the term about explicitly includes the exact endpoint, unless specifically stated otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation can apply regardless of the breadth of the range or the characteristics being described.

Disclosed herein are optical devices, as well as systems and methods including the optical devices or methods for designing or forming the same. The optical devices can be used in a wide variety of applications. However, the primary focus of the description herein is directed toward lenses and mirrors, such as may be used in optical projection systems. The principles described herein with respect to mirrors can be applied to other optical devices, as will be understood by one having skill in the art.

Referring to FIG. 1, a freeform optical device 100 is shown which has an at least partially curved surface 110 with a surface geometry. Surface normals 120 at multiple locations on the surface geometry can be computed to define the surface geometry with respect to multiple focal points corresponding to the surface normals at the locations in order to correct optical aberrations otherwise occurring at the focal points.

Figure 2:
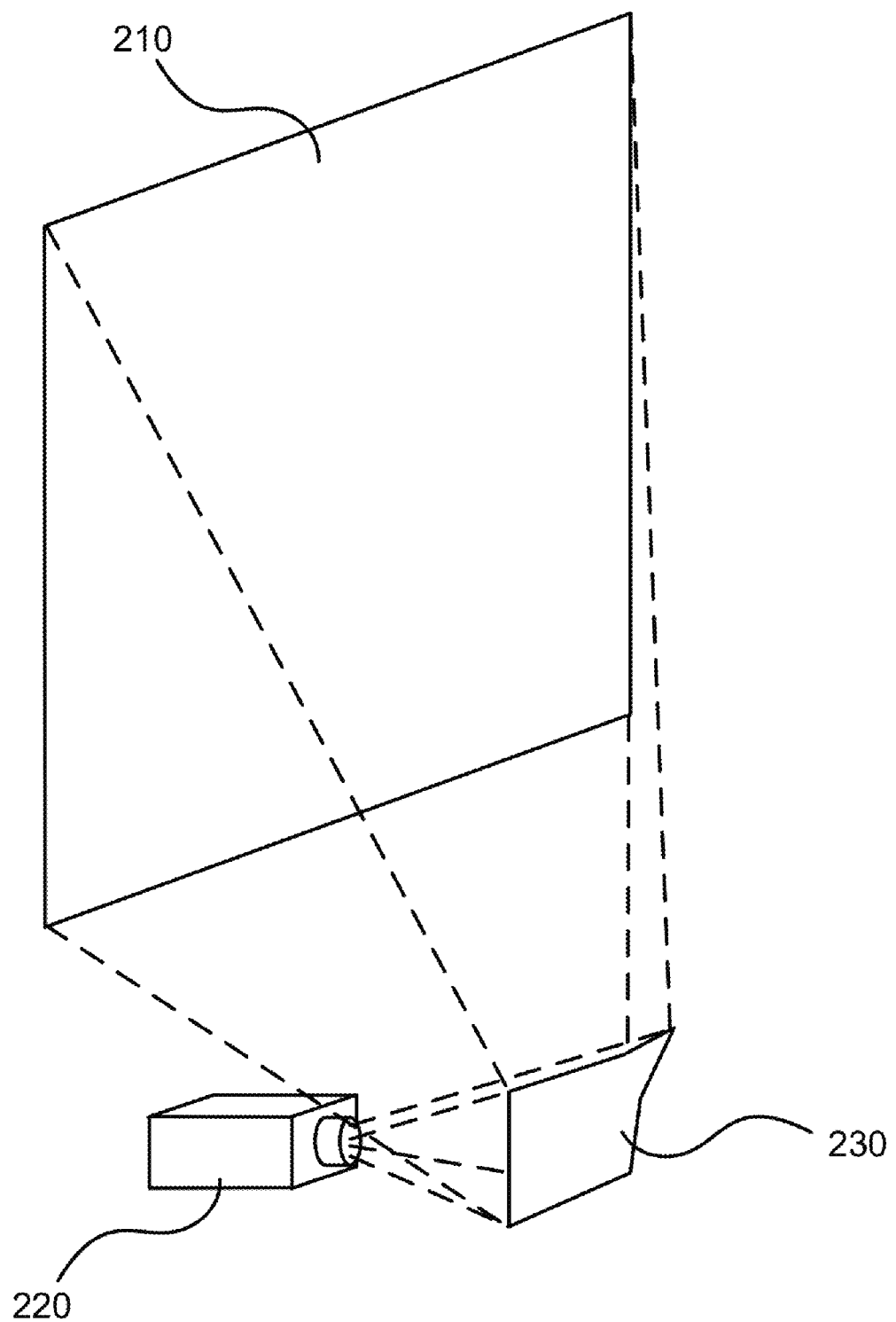
FIG. 2 is a perspective view of a reflective projection system using a computed freeform mirror in accordance with an embodiment of the present invention.

In accordance with embodiments, the freeform optical device can be used in connection with an optical projection system. Referring to FIG. 2, an ultra-short standoff image projection system is shown which includes a display screen 210, an image projector 220 configured to project image data, and a computed freeform mirror 230. The freeform mirror can reflect image data from the projector onto the screen. The freeform mirror comprises an at least partially curved surface having a surface geometry, wherein surface normals at a plurality of locations on the surface geometry are computed to define the surface geometry with respect to a plurality of points on the screen corresponding to the surface normals at the plurality of locations in order to correct optical aberrations otherwise occurring at the plurality of focal points.

The system of FIG. 2 can be configured for a display screen 210 with a diagonal dimension of at least 50 inches. In other embodiments, the diagonal dimension can be 60 inches or more. The system can be configured where a distance from the projector 220 to the mirror 230 to the screen is less than approximately 0.4 meters. The projection angle can be an off-axis oblique angle with respect to the display screen. A system as in FIG. 2 can be used in a rear projection television or any other type of reflected projection system. In one aspect, the back of the projector can be substantially aligned with the display screen. For example, the projector and the display screen can both be against a wall. In other aspects which will be described in further detail below, the freeform mirror can be shaped to map the image data to the screen by inverting the image horizontally, vertically, or horizontally and vertically.

Figure 3:
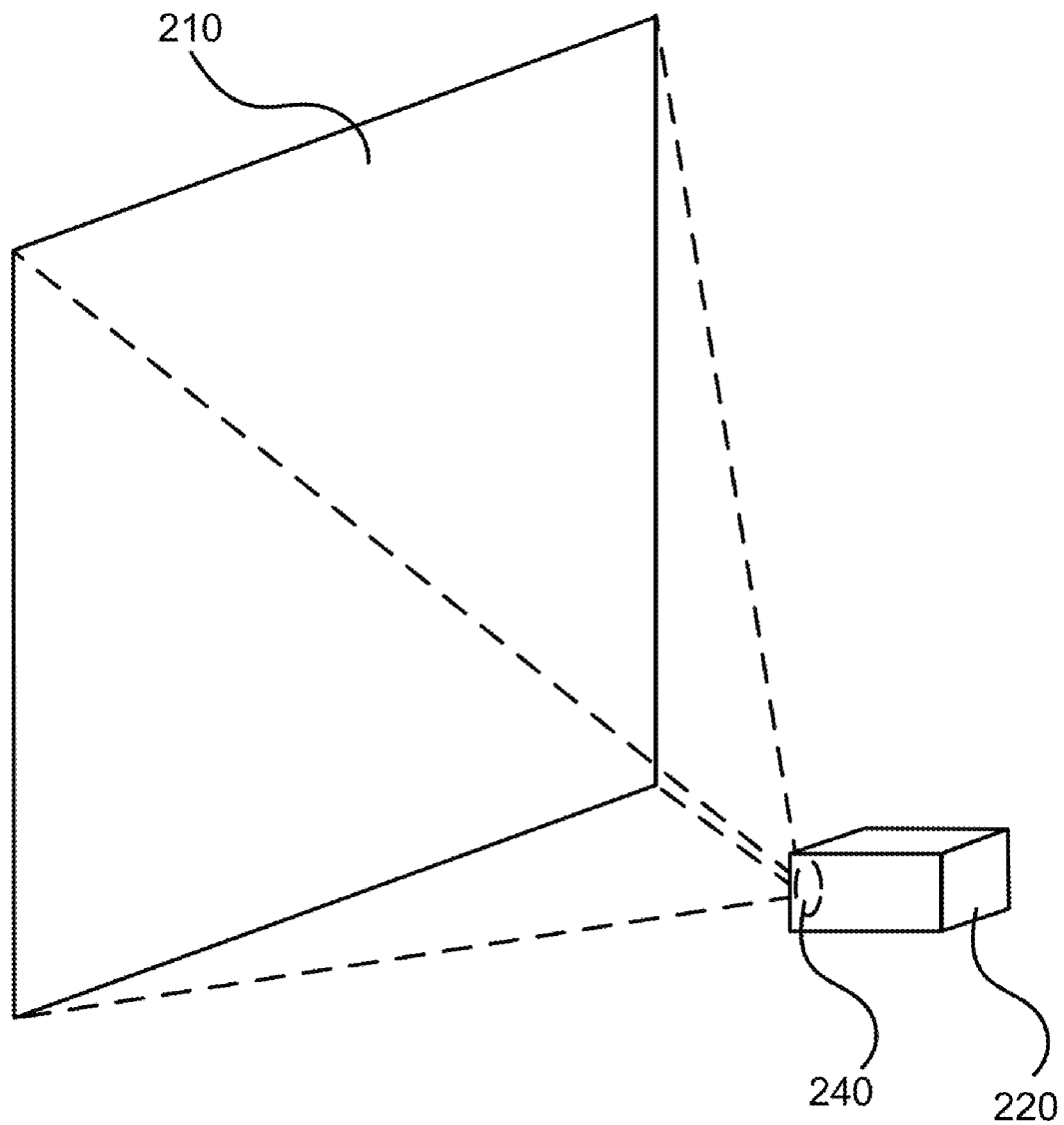
FIG. 3 is a perspective view of a projection system using a computed freeform lens in accordance with an embodiment of the present invention.

Referring to FIG. 3, a system is shown which includes a display screen 210, an image projector 220, and a freeform lens 240. The projector is configured to project an image onto the screen. The projector can have the freeform optical lens incorporated therein as an integral part of the projection system. The lens may comprise an at least partially curved surface having a surface geometry. Surface normals at a plurality of locations on the surface geometry can be computed to define the surface geometry with respect to a plurality of points on the screen corresponding to the surface normals at the plurality of locations to in order to correct optical aberrations otherwise occurring at the plurality of focal points. As with the system shown in FIG. 2, the system can be configured to display an image onto a large display screen having a diagonal dimension of at least 50 inches. A distance between the projector and the display screen can be less then approximately 0.4 meters or less than approximately 0.2 meters.

Figure 4:
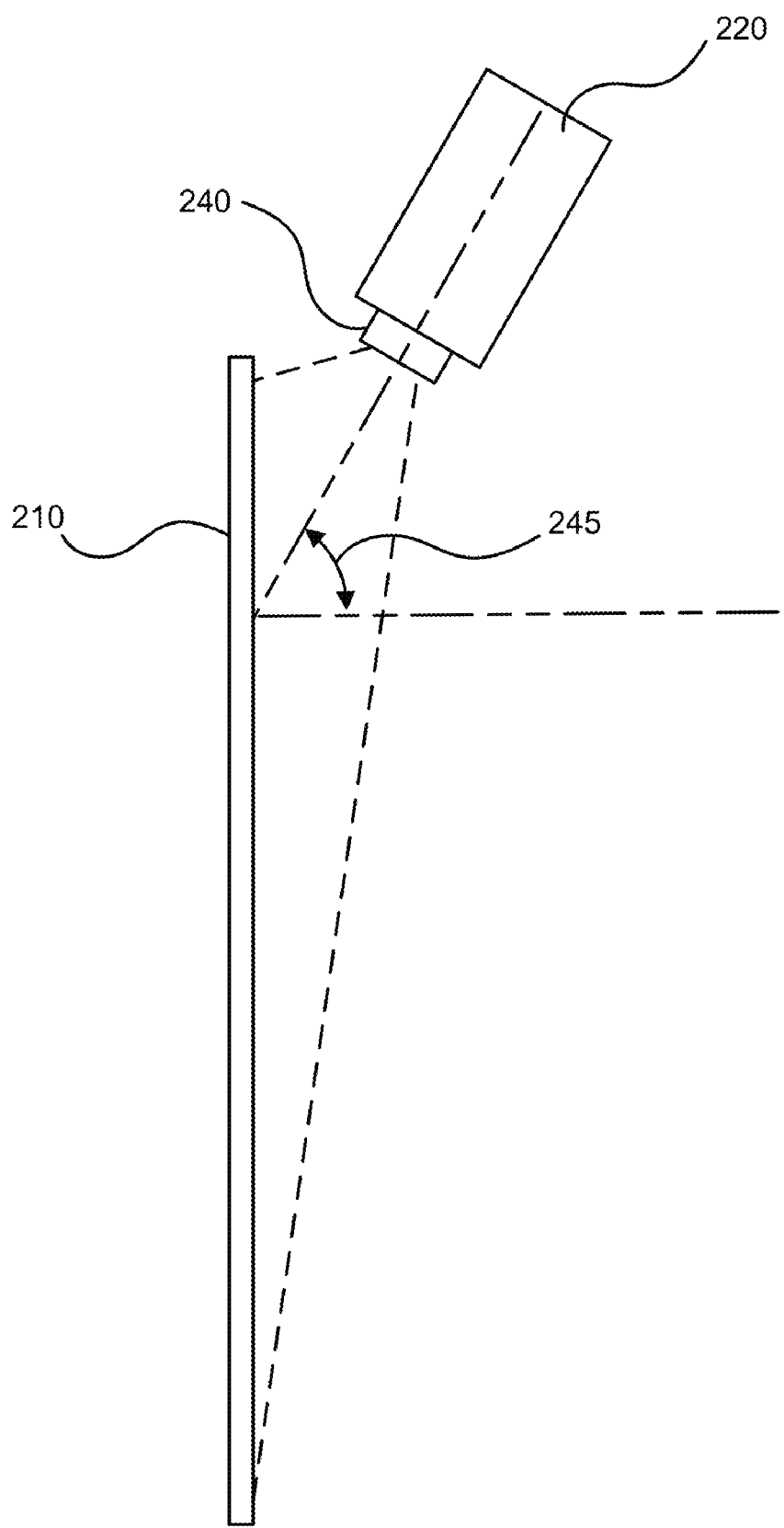
FIG. 4 is a side view of a projection system with a highly skewed, off-axis projection angle in accordance with an embodiment of the present invention.

Referring to FIG. 4, projection of an image onto the screen 210 can be from an off-axis projector 220 having a freeform lens 240 with respect to the screen and at an oblique angle 245. In some aspects, the oblique angle can be a substantially skewed oblique angle. For example, the angle can be greater than 45 degrees with respect to a screen surface normal. In other aspects, the angle may be greater than 60 or 70 degrees with respect to the screen surface normal. Although FIG. 4 illustrates an example using a direction projection onto a screen as opposed to a reflected projection using a mirror, similarly skewed oblique angles may also be used when using reflected projection systems.

Figure 5:
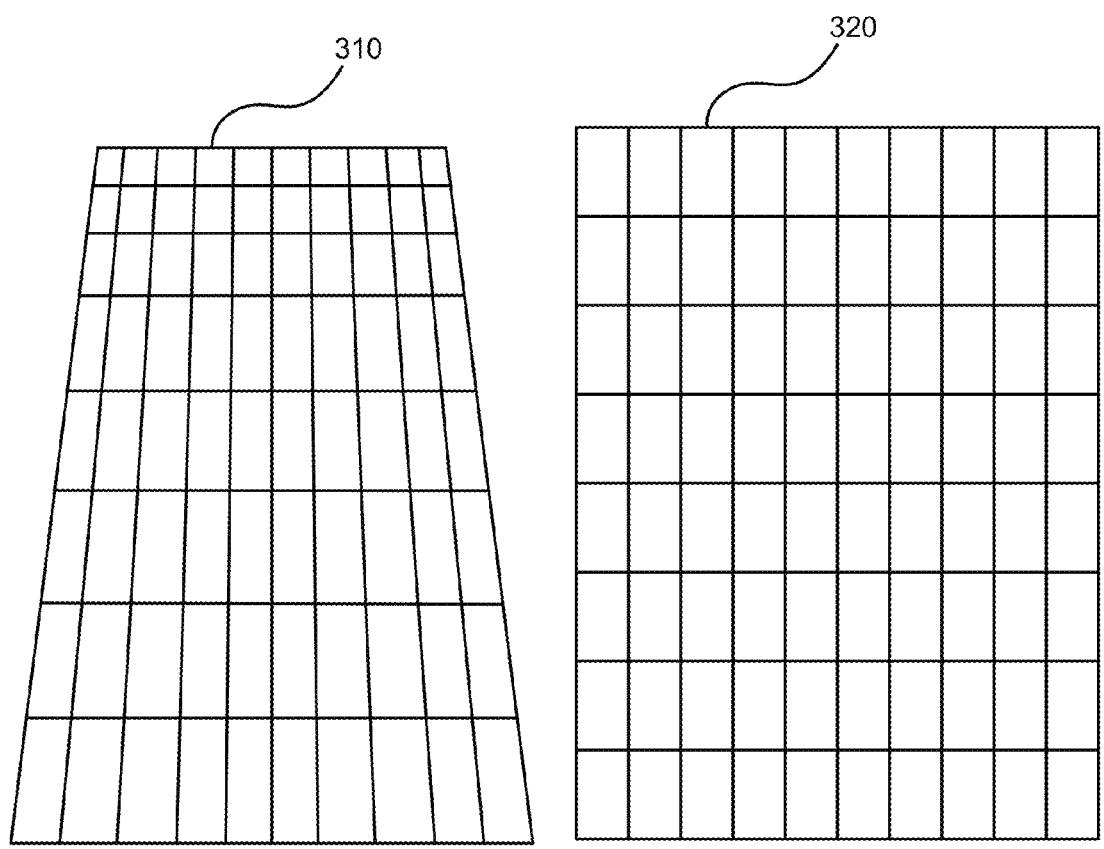
FIG. 5 is a depiction of distorted and corrected keystones in accordance with an embodiment of the present invention.

Previous projection systems have suffered from keystone distortion and other optical aberrations when projecting images from off-axis and/or skewed angles. Referring to FIG. 5, a keystone distortion 310 is shown which may be typical of previous projection systems from skewed or off-axis projection points. The systems and methods described herein can enable an off-axis and/or skewed projection which corrects for such keystone distortion and other aberrations to provide a clear, undistorted image with a proper keystone 320.

The freeform optical device can simplify optical system design by using freeform reflective surfaces to correct various image distortions caused by skewed projection angles. Also, stand-off distance can be reduced significantly to enable many new market opportunities (such as small office meetings, shop window advertisements, airplane/bus/train cabinet displays, portable/mobile projection systems, video gaming, and virtual reality environments) which traditional long stand-off distance projectors cannot address. The optical device can also substantially eliminate presenter occlusion and further encourage user interaction with the projected images and video. In projection systems, the optical device can be used in and enable both compact frontal projection systems as well as ultra-thin rear projection systems.

The freeform optical device can dramatically reduce stand-off distances between projectors and screens by up to 10 times or more. For example, by taking full advantage of the design freedom of a freeform surface profile, the computed freeform optical device can reduce the stand-off distance of large projection images (>50") from existing 2~4 meters to 0.2~0.4 meter. The 10 fold reduction of standoff distance and use of a highly skewed projection angle can virtually eliminate occlusion problems of traditional frontal projection displays since interaction activities of viewers/presenters in front of a screen would no longer block the light path of the image projection. The freeform optical device can enable a new generation of compact projector products that have ultra-short stand-off distances, as well as facilitate new generations of ultra-thin rear-projection TV products.

Objectives and capabilities of the system include:
(1) Use off-axis oblique angle projection to avoid blocking a viewer's line of sight;
(2) Minimized standoff distance to preserve space for user interaction;
(3) Maximized projected image size at a given standoff distance;
(4) Minimized geometric distortion of projected images typically caused by skewed angle projection;
(5) Maintenance of excellent image quality by minimizing other optical aberrations;
(6) Minimization of size, weight and cost of the overall system.

In achieving these objectives and capabilities, the system may differ in some respects from traditionally designed systems. For example, the optical engine can be moved from a central frontal location to the side of the screen, resulting in a skewed angle projection system that has a much shorter standoff distance. Instead of using an all-lens optical system, such as the short-throw lenses described above, the system can use a computed freeform mirror (CFM) as the reflective component of the projection system or a computed freeform lens as the transmissive component of the system. Because the surface profile of the mirror or lens can be very accurately computed in advance, significant geometric distortion (e.g., keystone distortion, etc.) can be corrected. Reference herein is often made to one or the other of a computed freeform mirror and a computed freeform lens. However, unless otherwise explicitly indicated, it is to be understood that the principles being described may be equally applicable to both lenses and mirrors.

Figure 6:
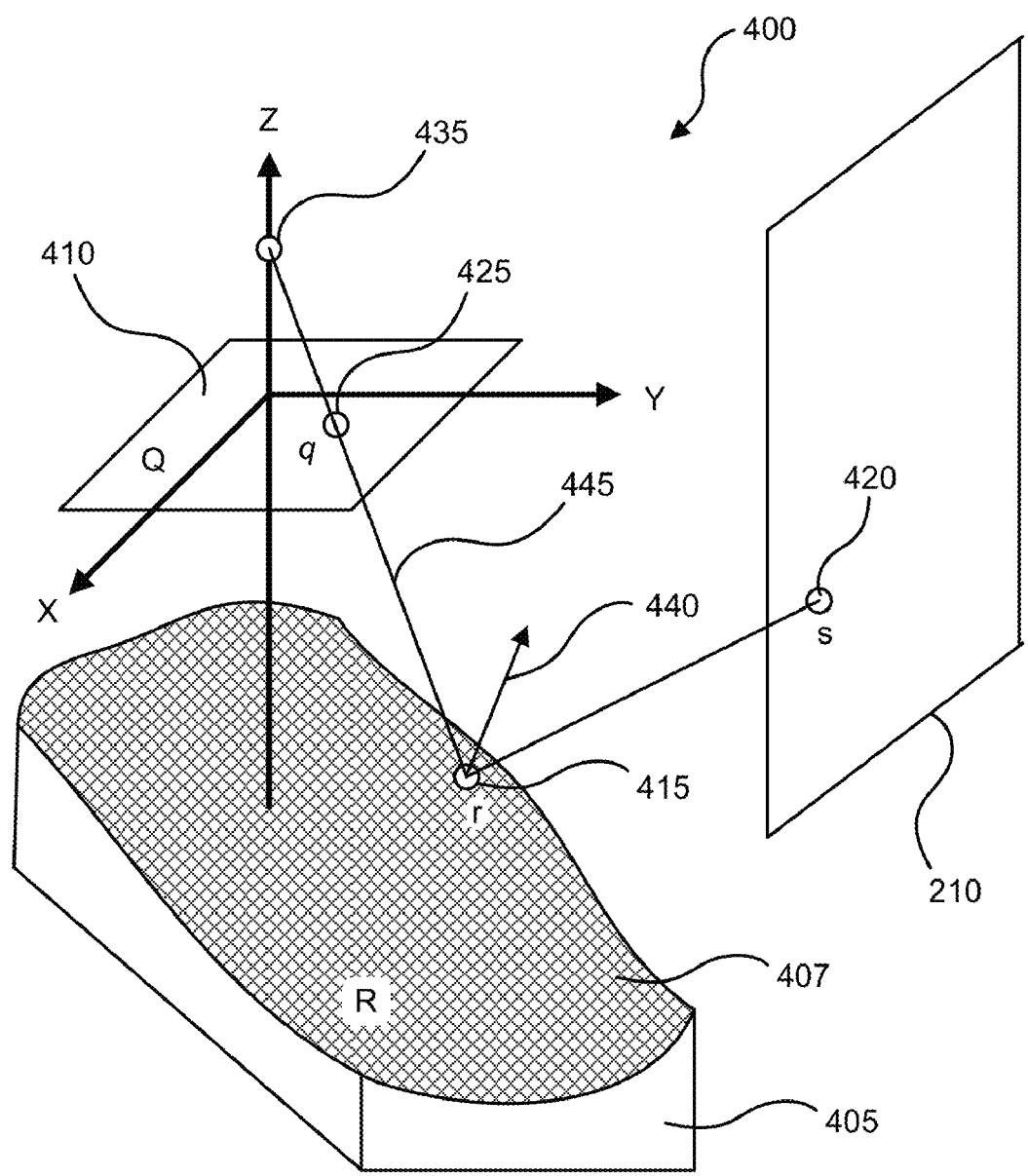
FIG. 6 is a block diagram illustrating a surface design of a computed freeform optical element in accordance with an embodiment of the present invention.

An integrated optical design technique 400 for CFM display systems with both lenses and mirrors will now be described with reference to FIG. 6. Suppose that an arbitrary Screen to Imager (S2I) mapping relationship M maps any point s 420 in a screen 210 onto its corresponding point q 425 on projector's imager plane 410 inside the optical engine via a reflecting point r 415 on the computed freeform mirror R 405. A surface profile of the computed freeform mirror can then implement this map as accurately as possible. As shown in FIG. 6, the projection ray 445 originating from focal point f 435 intersects the imager plane 410 at corresponding point q. The ray continues traveling, strikes the mirror surface 407 at point r, and is then reflected by the mirror according to the law of reflection (e.g., the angle of reflection is equal to the angle of incidence) towards the point on the screen s.

Generally speaking, a difficulty with computed freeform mirror design is to find a mirror profile R for a desired screen-to-imager (S2I) mapping relationship M. In the case of the present CFM projection display design, the screen-to-image mapping relationship can be a map of a rectangular plane in 3D space onto an image plane Q according to an arbitrarily prescribed order. However, neither the rectangular plane nor the image plane need be planar. Indeed, the systems and methods for calculating a surface profile of the mirror can be adapted for a profile image or projection plane.

The mirror surface profile can be specified by using a surface normal N(r) 440 at each surface point 415. In theory, constraints imposed by the S2I mapping can be used to derive partial differential equations (PDEs) that specify the mirror surface 407. Analytical solutions for the PDEs can then be used to determine the mirror shape. However, a theoretical close-form solution for N(r) with arbitrarily defined mapping relationship can be difficult. There currently exists no theoretical close-form solution to a general design problem. Even though a solution may exist for some simple cases, the approach of deriving and solving PDEs for each S2I map can be cumbersome and difficult to scale. Therefore, rather than attempting to develop a universal freeform mirror design theory, propose herein is a computational method and software for designing the CFM (together with primary optics) that produces accurate surface geometries to achieve a desired S2I mapping relationship.

Figure 7:
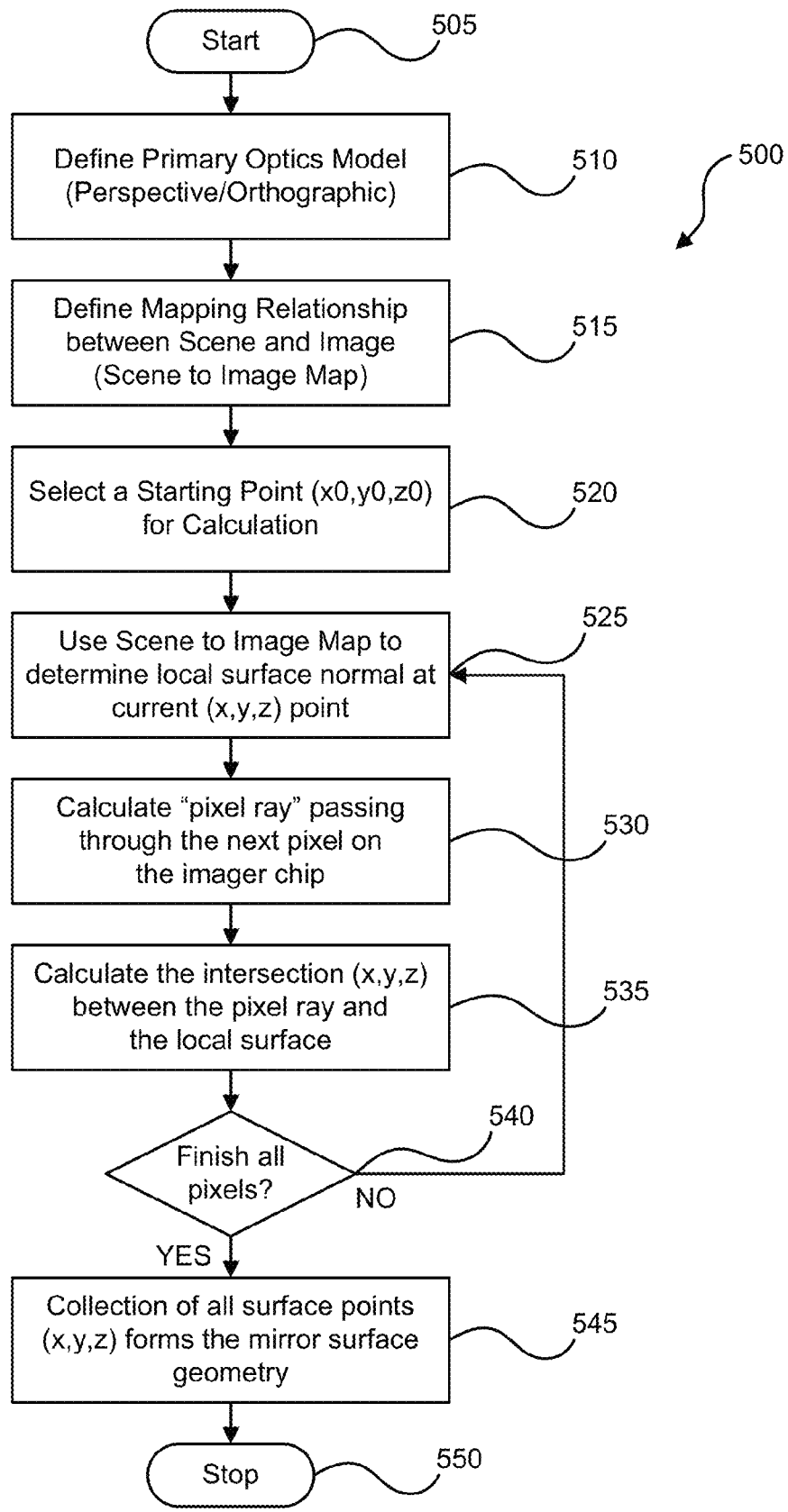
FIG. 7 is a flow diagram of a process for designing a surface contour of a computed freeform optical element in accordance with an embodiment of the present invention.

FIG. 7 shows a flowchart of our Computed freeform mirror design software. The method begins 505 with selecting a starting point r(x0,y0,z0) 520 on a mirror surface after defining a primary optics model 510 and a mapping relationship 515. This point can usually be determined by system design parameters, such as stand-off distance, mirror size, etc. Starting from this point, the mirror shape can be determined and/or defined by finding surface normals N(r) at any and all points on the mirror surface for the desired mapping relationship. The surface normal at a surface point can be calculated 525 based on the pre-defined imager-to-scene mapping and the reflection law of optics (impinging angle equals to reflecting angle). Using symbols defined above, the normal vector is given by:

$$N(r) = \|q-r\| + \|s-r\| = \frac{q-r}{|q-r|} + \frac{s-r}{|s-r|} = [n_x, n_y, n_z]^T$$

where point q on the image plane corresponds to point s in the scene via reflecting point r on mirror surface. $n_x$, $n_y$, and $n_y$ are the components of the normal vector. T is the transpose of a vector which changes a column vector to a row vector, or vice versa.

The location of the current surface point r(x0,y0,z0) and the local surface normal N(x0,y0,z0) can determine a local surface. The method can propagate from a current surface point to a next point by solving 530 the intersection point of the current surface with the pixel ray. To obtain the next point, r(x,y,z), the method can include calculation of the ray based on projection geometry and location for projection on a screen as follows:

$$Q(r) = \frac{[Q_x, Q_y, Q_z - f]^T}{\|[Q_x, Q_y, Q_z - f]^T\|} = [q_x, q_y, q_z]^T$$

The intersection point between the ray Q and the local surface becomes the next point r(x,y,z). The method can then further include solving 535 a liner equation to find the coordinate of next point r:

Ar=B, where $$A = \begin{vmatrix} n_x & n_y & n_z \\ \dfrac{1}{q_x} & -\dfrac{1}{q_y} & 0 \\ 0 & \dfrac{1}{q_y} & -\dfrac{1}{q_z} \end{vmatrix}, B = \begin{bmatrix} n_x R_x + n_y R_y + n_z R_z \\ \dfrac{Q_x}{q_x} - \dfrac{Q_y}{q_y} \\ \dfrac{Q_y}{q_y} - \dfrac{Q_z}{q_z} \end{bmatrix}$$

The design methods can use the same routing 540 to calculate all of the points on the mirror surface to define an accurate surface geometry 545 that implements the prescribed S2I mapping before stopping 550.

The design methods herein can offer tremendous design flexibility for designers in defining an arbitrary S2I map from any point on the screen to pixels on the imager. In some aspects, the methods can include or be based on multiple assumptions. For example, one assumption may be that the system has some known primary optics with known qualities or characteristics. Another assumption may be that the system has a known fixed number of mirrors. However, at least in some aspects the surface profiles of these mirrors may be unknown. In other aspects, the methods can be used to create a computed freeform primary optic for the projection device or to create a secondary computed freeform lens to be used with the primary optic.

In some aspects, the design approach can be described: given a desired S2I map and a model of primary optics, what is the mirror profile that best implements the given S2I map.

Primary optics can be selected to suit an application using a computed freeform optical device. For example, the primary optic can be a simple perspective lens or a complex lens system, or even a lens/mirror system, as long as such systems can be modeled.

Figure 8:
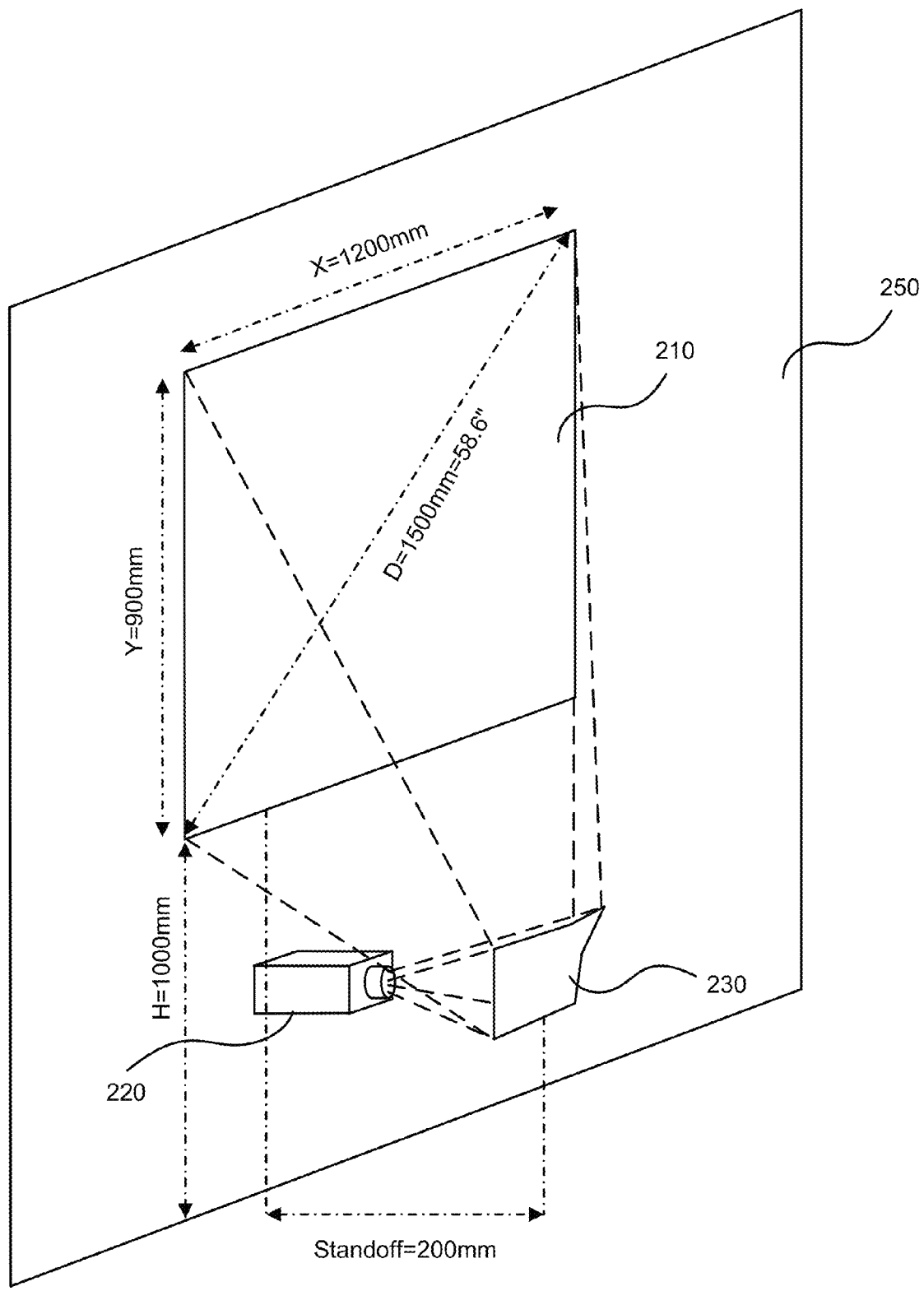
FIG. 8 is a perspective view of a reflective projection system using a computed freeform mirror which illustrates exemplary dimensions and distances in accordance with an embodiment of the present invention.

In implementing the systems, devices, and methods herein, an off-the-shelf video projector can be used as the optical engine. For example, a computed freeform mirror can be designed to expand the display size of the projector to 1500 mm (58.6 inches) in diagonal with a standoff distance only 200 mm. FIG. 8 illustrates the system configuration and design parameters defined for this particular example, in a system with the screen and the projector against a wall 250.

Figure 9:
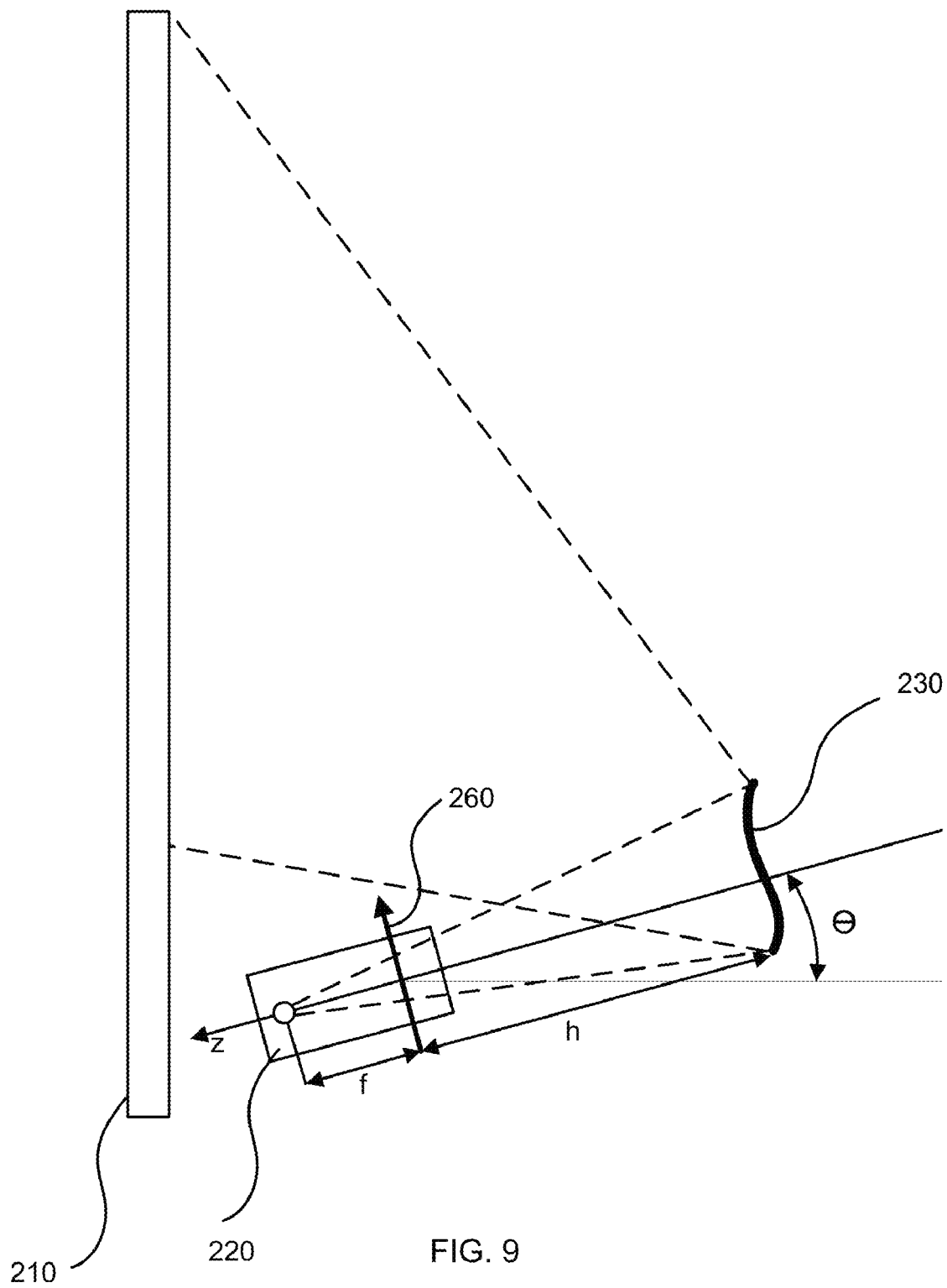
FIG. 9 is a side view of a reflective projection system illustrating standoff distance determination with respect to an image plane and a focal point in accordance with an embodiment of the present invention.

FIG. 9 illustrates a projection geometry on a y-z plane. The z-axis is tilted 0 degrees due to the upward tilting of optical axis of the existing design of an off-the-shelf projector. The projector can be modeled as a diverging point light source passing a transparent imager chip on the imager plane to form a projected image.

Actual projectors may have different imager or optical setups, but in some aspects a unified equivalent model can be used to represent the optical performance of projectors generally. The equivalent focal length f in this example can be experimentally measured via calibration tests. Another design parameter considered in this example is h, the "standoff distance" from imager center 260 to the center point on the freeform mirror. Standoff distance can also be computed as the distance between a computed freeform lens and a screen or as the total distance from a projection optic to the screen via a computed freeform optical device (either mirror or lens). Reduction of h can reduce the standoff distance of the projection display system to create a more compact system.

Figure 10:
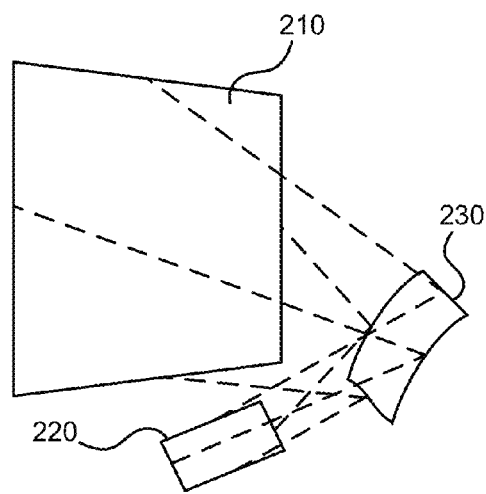
FIG. 10 includes block diagrams of system configurations for inverting projected images in accordance with an embodiment of the present invention.
Figure 10:
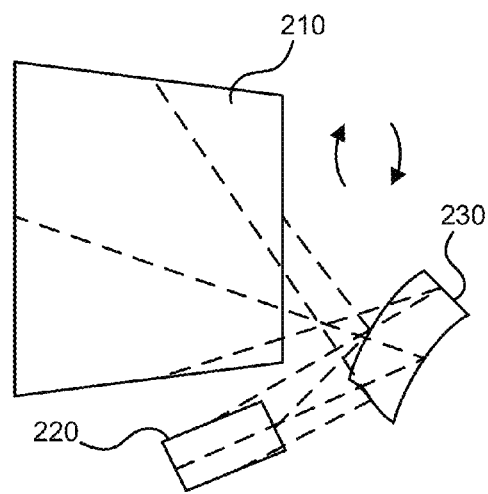
Figure 10:
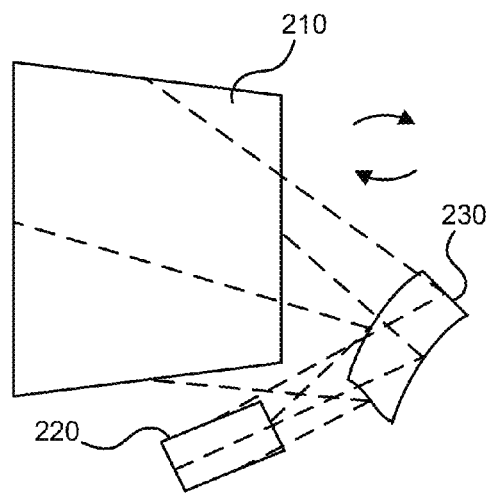
Figure 10:
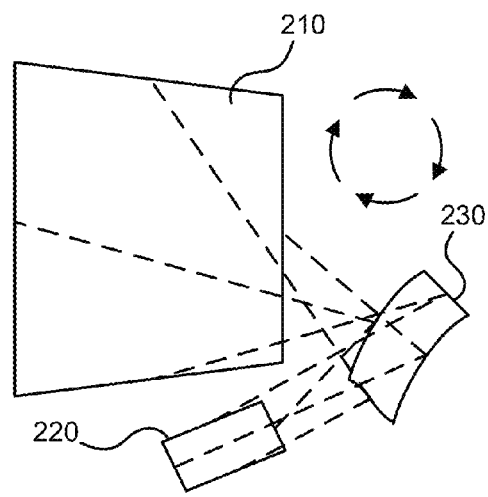

One point of significance with the computed freeform optical devices described herein is that for the same scene area with exactly the same size and shape, different orders of mapping can result in different mirror shapes. FIG. 10 illustrates four mapping examples where both the area of imager and area of display screen are the same, but due to the vast flexibility of the computed freeform optical devices, pixels on the same area of an imager can be mapped onto different areas on the display screen, resulting in different-shaped freeform optical devices.

FIG. 10 shows four types of design results (as "Type-A", "Type-B", "Type-C", and "Type-D"). The differences among these four designs are based on the different mapping orders in which pixels on the imager are mapped to the particular area of the scene. The differences in combinations of "direction" and "orientation" of pixel arrays that map toward the display screen can lead to different shape orientations of mirror patches, resulting in different overall shapes of the computed freeform optical devices.

Considering the Type A design as an example, the screen-to-image (S2I) relationship maps the imager onto screen. Pixels on upper edge of the imager chip can be mapped to an upper side of the display screen, while pixels on the lower edge of the imager can be mapped to the lower side of the display screen. Likewise, pixels on the left edge can be mapped toward the left edge of the display screen, while pixels on the right edge can be mapped toward the right edge of the display screen. In Type B, the mapping is such that pixels on the upper edge of the imager chip are mapped to a lower side of the display screen, while pixels on the lower edge of the image chip are mapped to an upper side of the display screen.

Considering Type C, the mapping is such that pixels on the right edge of the imager chip are mapped to a left side of the display screen, while pixels on the left edge of the image chip are mapped to a right side of the display screen. Finally, in Type D, the mapping is such that pixels on the upper edge of the imager chip are mapped to a lower side of the display screen, pixels on the lower edge of the image chip are mapped to an upper side of the display screen, pixels on the right edge of the imager chip are mapped to a left side of the display screen, and pixels on the left edge of the image chip are mapped to a right side of the display screen.

Figure 10A:
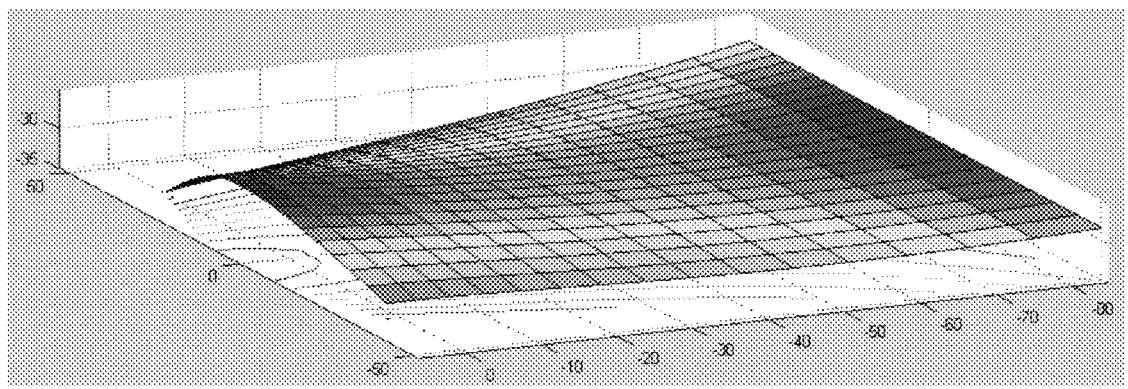
FIGS. 10A-10D illustrate computed shapes of computed freeform optical elements for inverting the projected images as shown in FIG. 10 in accordance with an embodiment of the present invention.
Figure 10B:
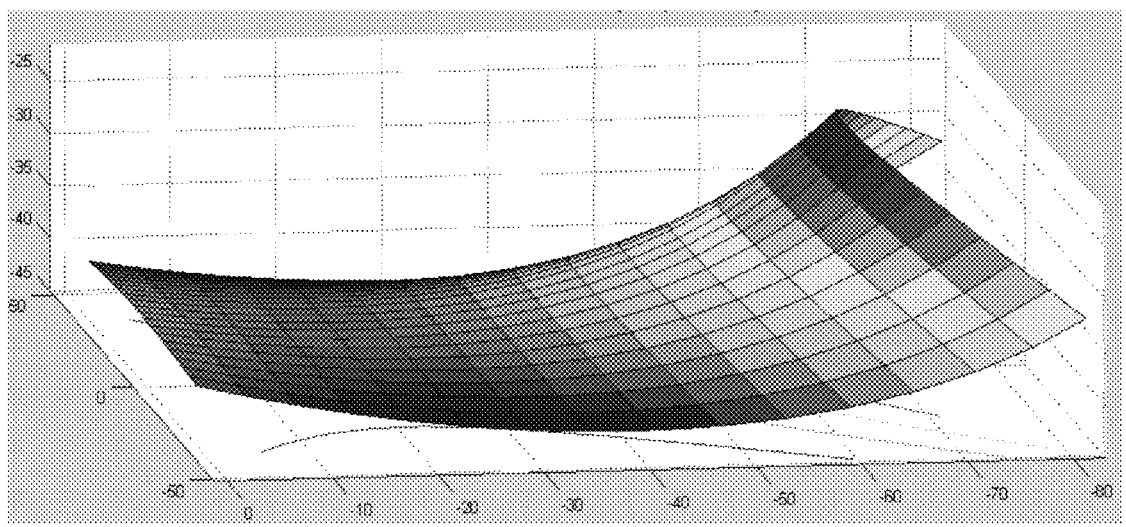
Figure 10C:
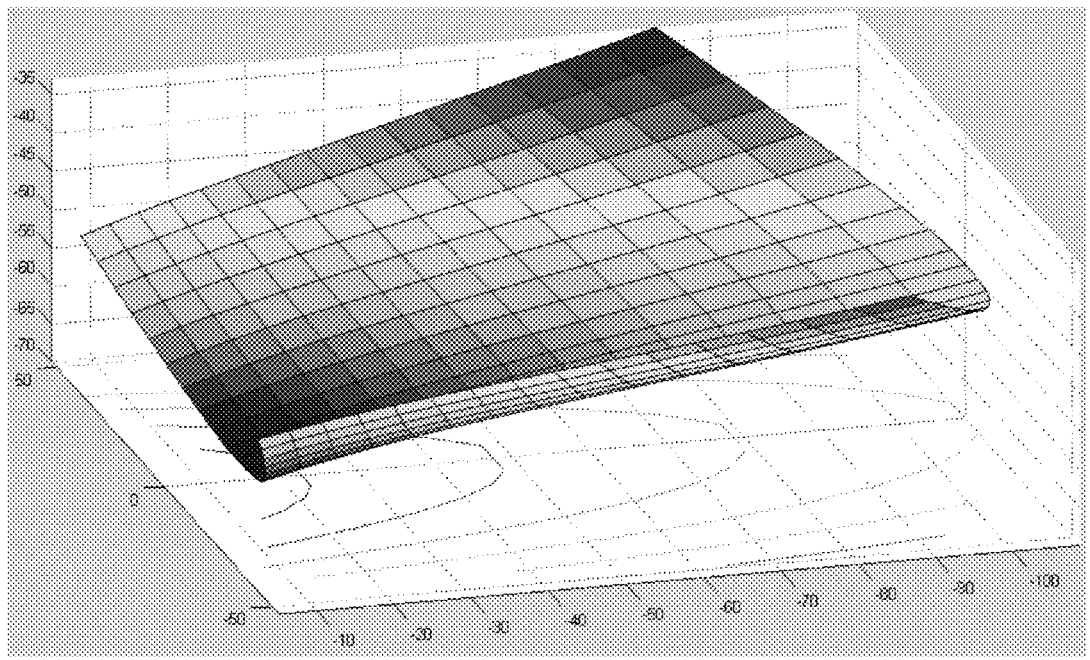
Figure 10D:
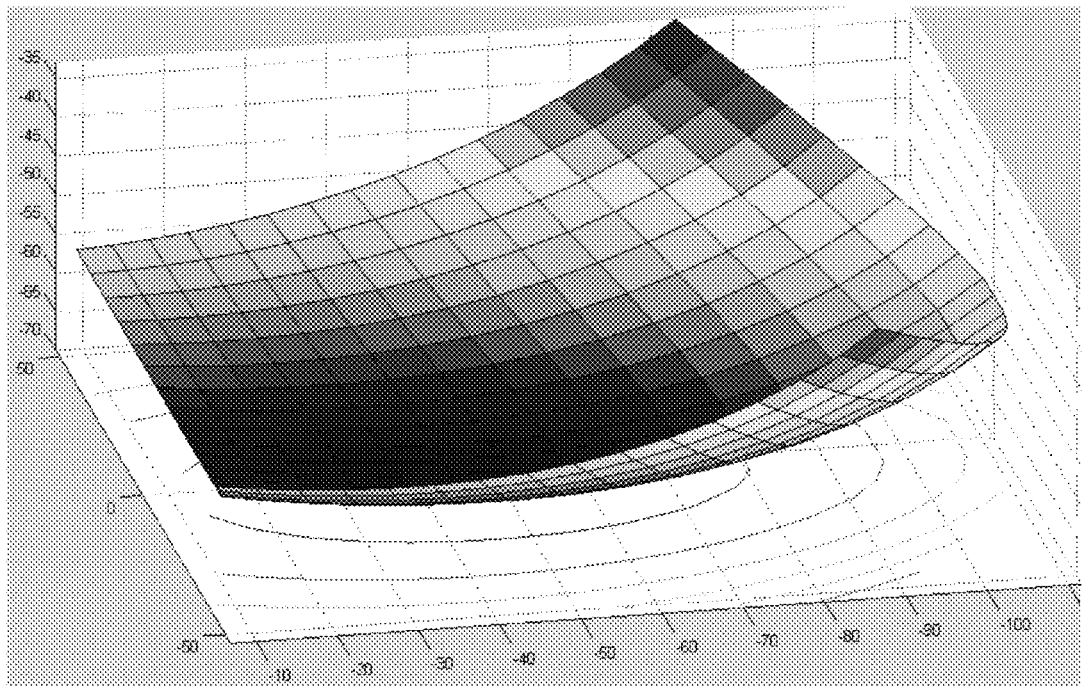

Using the computed freeform optical device design techniques proposed herein, mirror surface profiles can be obtained, and using essentially the same design techniques similar mirror designs having different types of mapping orders can be obtained on the same screen-to-image map, as evidenced by the four different mirror designs shown in FIGS. 10A-D. FIG. 10A corresponds to Type A described above, FIG. 10B corresponds to Type B, FIG. 10C corresponds to Type C, and FIG. 10D corresponds to Type D. The design systems and methods can also be used for mirror designs with other types of screen-to-image mappings as well.

Figure 11:
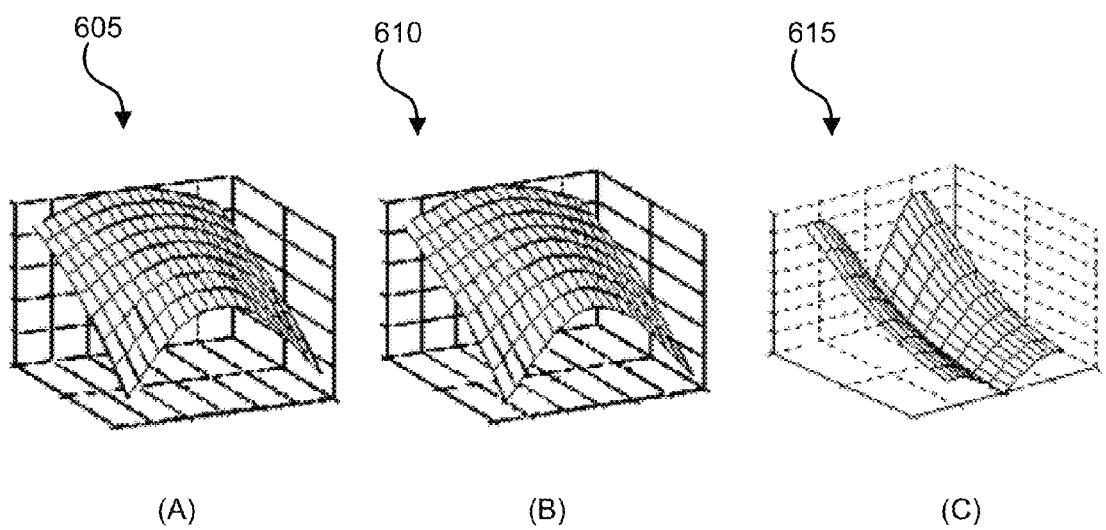
FIG. 11 includes graphical representations of a surface contour of an optical device designed according to an embodiment of the present invention and a minimized distortion of the surface contour of when refined in accordance with an embodiment of the present invention.

In some embodiments, the freeform optical device can be designed by performing a single pass of the method to calculate the various points of the surface profile. However, in some embodiments, an iterative optimization method can be used to further improve the design. Use of aspherical and non-symmetrical optical components can enable design freedom for optimizing design parameters of each component to achieve a desired overall system performance. For example, given a Scene-to-Image (S2I) map, there may be an infinite number of choices for mirror location in three dimensional space. By applying iterative optimization methods, overall design accuracy and quality can be improved. FIGS. 11 (A)-(B) shows an example of the iterative optimization process.

The original mirror surface design 605 (after the first run) is shown. An optimized surface shape 610 after 10 iterations is also shown. FIG. 11 (C) shows a plot 615 of the error surface between the first and second designs 605, 610. The error is approximately 9% of the surface profile magnitude. The error calculation demonstrates the effectiveness of an iterative optimization method in improving mirror surface design.

Figure 12:
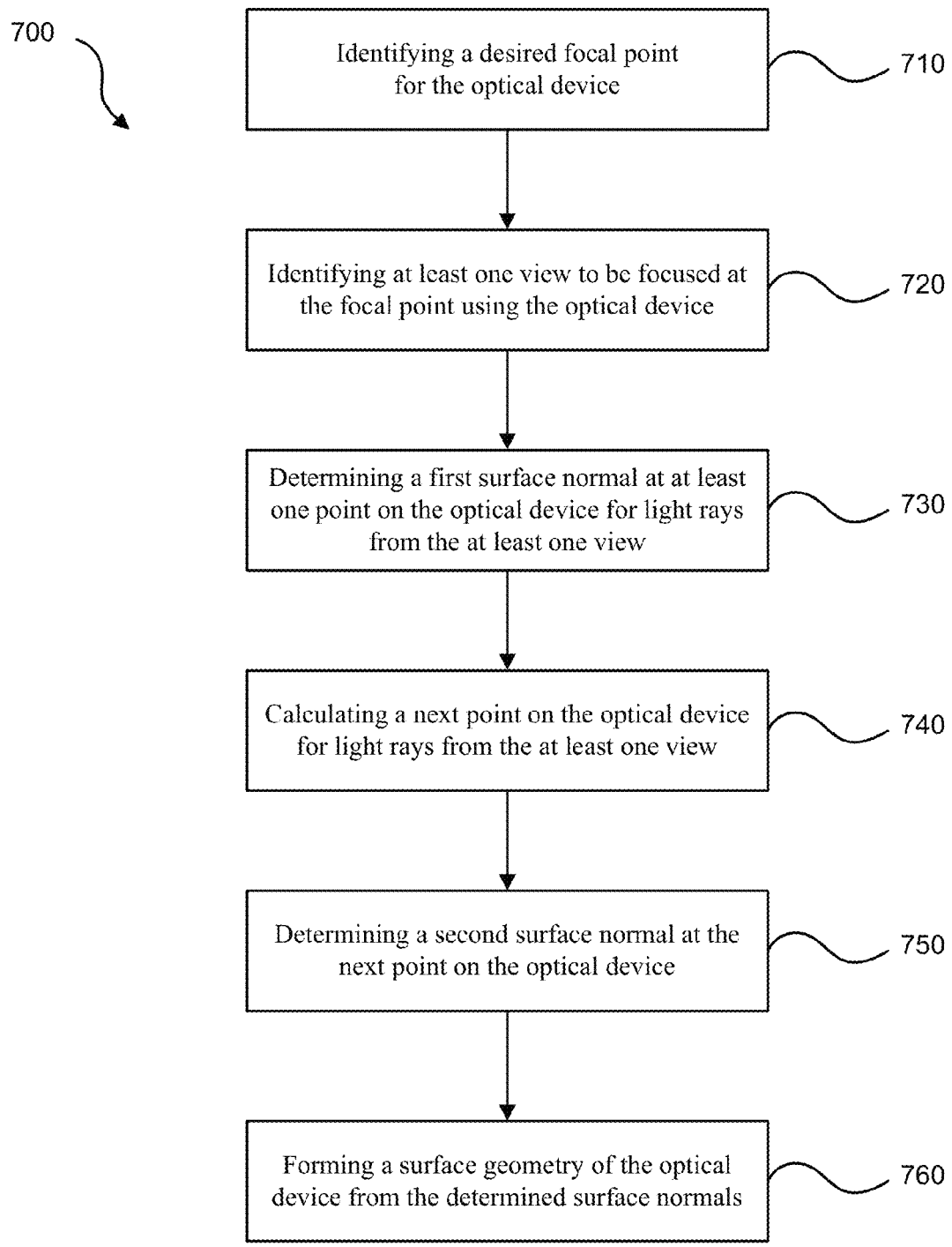
FIG. 12 is a flow diagram of a method for designing a computed freeform optical element in accordance with an embodiment of the present invention.

In accordance with embodiments, and referring to FIG. 12, a method 700 is provided for designing an optical device with minimized distortion. The method includes identifying 7010 a desired focal point for the optical device. At least one view to be focused at the focal point using the optical device can be identified 7020. The method can include determining 7030 a first surface normal at at least one point on the optical device for light rays from the at least one view. A next point on the optical device can be calculated 7040 for light rays from the at least one view. A second surface normal can be determined 7050 at the next point on the optical device. A surface geometry of the optical device can be formed 7060 from the determined surface normals.

Figure 13:
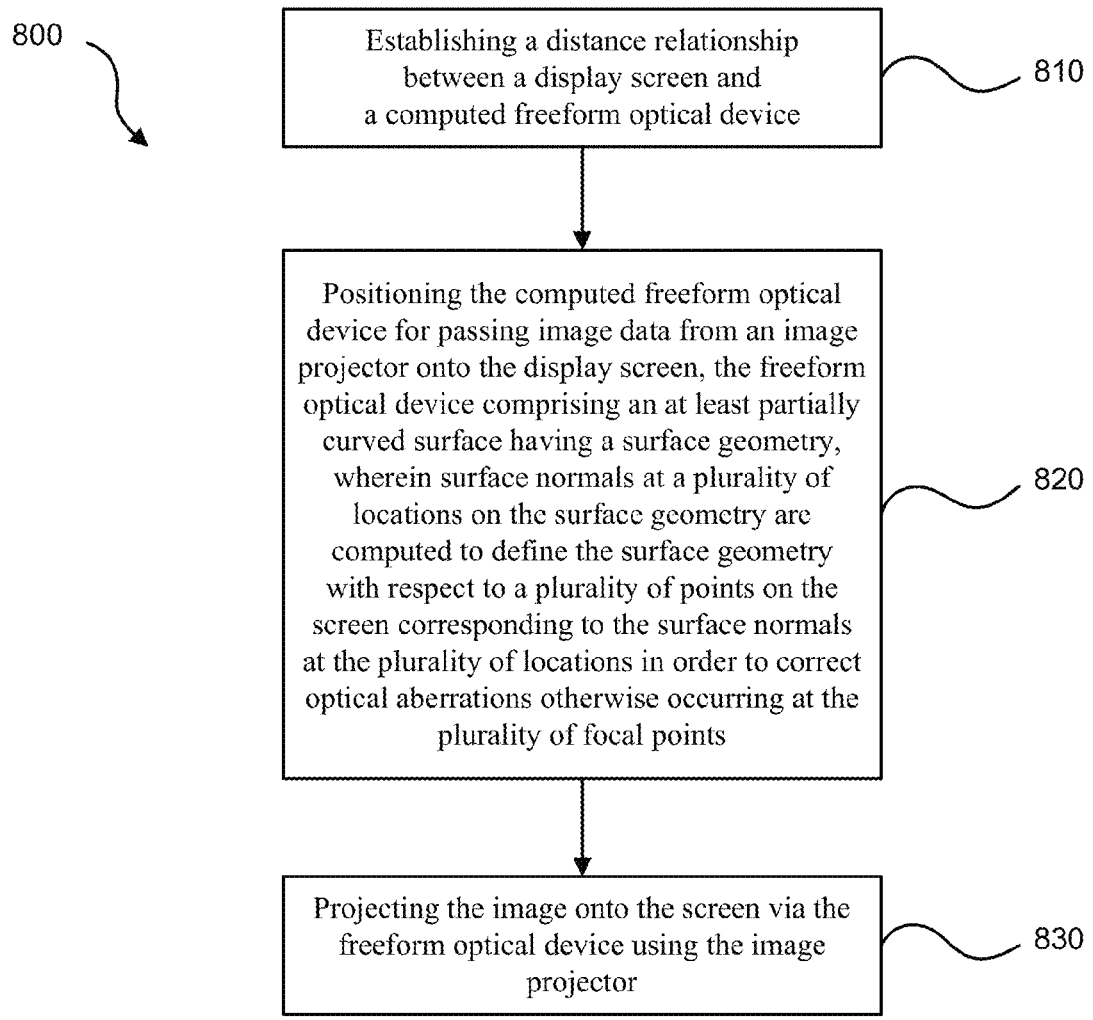
FIG. 13 is a flow diagram of a process for projecting an image using computed freeform optical element in accordance with an embodiment of the present invention.

In accordance with embodiments, and referring to FIG. 13, a process 800 is provided for projecting a short standoff image. A distance relationship can be established 810 between a display screen and a computed freeform optical device. The computed freeform optical device can be positioned 820 for passing image data from an image projector onto the display screen. The computed freeform optical device may be a part of the image projector or may be a mirror off of which a projected image is reflected. The freeform optical device can include an at least partially curved surface having a surface geometry. Surface normals at a plurality of locations on the surface geometry can be computed to define the surface geometry with respect to a plurality of points on the screen corresponding to the surface normals at the plurality of locations in order to correct optical aberrations otherwise occurring at the plurality of focal points. The image can be projected 830 onto the screen via the freeform optical device using the image projector.

In some aspects of the process, positioning the projector can include positioning the projector at a highly skewed angle of at least 70° relative to a selected edge of the display screen. The standoff distance of the projector to the display screen via the optical device can be less than approximately 0.4 m. The computed freeform optical device may comprise a mirror for reflecting image data from the projector onto the display screen. In other aspects, the computed freeform optical device may comprise a lens for transmitting image data from the projector onto the display screen.

Figure 14:
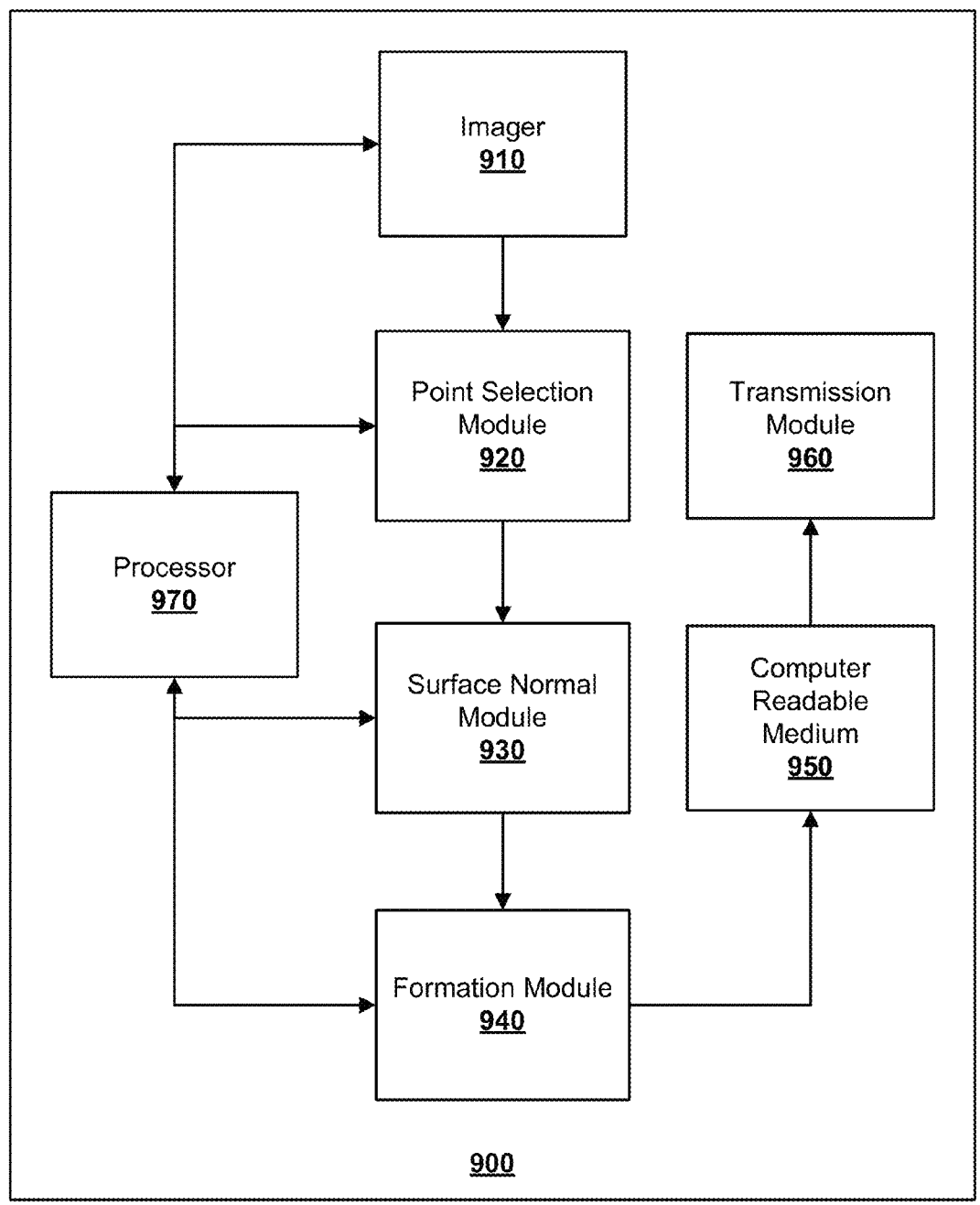
FIG. 14 is a block diagram of a system for designing a computed freeform optical element in accordance with an embodiment of the present invention.

Referring to FIG. 14, a system 900 is shown for designing a computed freeform optical device in accordance with an embodiment of the present invention. The system includes an imager 910. The imager can provide simulated locations of the optical device, as well as a view, and a focal point of the view from the optical device. A point selection module 920 can be used to determine a first point on a surface of the optical device and to calculate a next point on the surface. A surface normal module 930 can be used to determine surface normals for the surface of the optical device at the first point and the next point. A formation module 940 can also be included in the system to form a surface geometry of the optical device from the determined surface normals. The system can include a computer readable medium 950 configured to store the surface geometry. The system can also include a transmission module configured to transmit the surface geometry from the formation module 960 to a machining device. The system can include a machining device configured to machine or form the surface geometry on a substrate. For example, the machining device can include a lathe, a mold, or any other suitable device for machining or shaping the substrate to match the surface geometry. In one aspect, the system can include a processor 970 in communication with the imager, point selection module, surface normal module, and formation module and configured to process data from the imager, point selection module, surface normal module, and formation module.

The final shape of the computed freeform optical device surface can be designed using a computer and/or processor or other type of system. In one aspect, ray tracing can be used to determine surface normals to direct incident light rays toward the desired focal point. Once the final shape of the optical device surface is determined, the optical device can be fabricated. In one example, a mirror can be fabricated using an anodized aluminum alloy substrate material. A six axis machining center can be used to mill out the precision shape of the freeform mirror surface. The surface can be polished to become reflective. In one aspect, the fabricated mirror can be a test mirror to test reflectiveness, distortion, etc. of the shape. The substrate material or the design as stored on a computer readable medium can be used to make a metal mold to produce the freeform mirror. The mold can be used with glass or plastic substrate materials, or other suitable materials, to form a mirror out of the selected material and in the shape of the mold.

Figure 15:
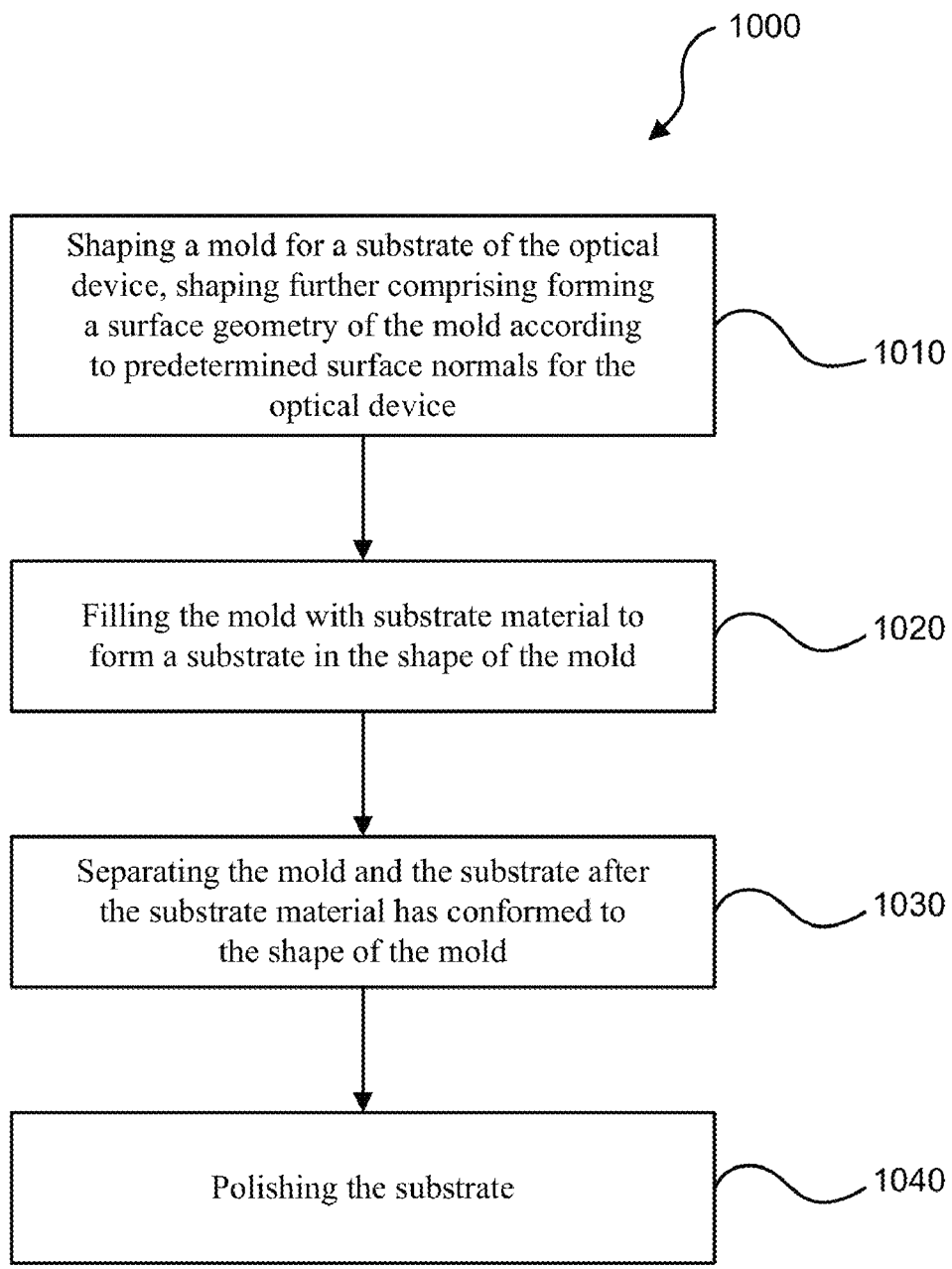
FIG. 15 is a flow diagram of a method for creating computed freeform optical element in accordance with an embodiment of the present invention.

Reference will now be made to FIG. 15. In one aspect, a method 1000 for forming an optical device in accordance with embodiments may include the following steps. A mold for a substrate of the optical device can be shaped 1010. Shaping can include forming a surface geometry of the mold according to predetermined surface normals for the optical device. The mold can be filled 1020 with substrate material to form a substrate in the shape of the mold. The mold and the substrate can then be separated 1030 after the substrate material has conformed to the shape of the mold and the substrate can be polished 1040. At least one side of the substrate can be coated with one or more reflective materials to form the optical device into a mirror.

Mirror and lens making is well-known and the various techniques known in the art are contemplated. The following description of formation of the mirror is for example and is not a limitation of the techniques by which mirror in accordance with the embodiments herein may be manufactured. Mirrors can typically be manufactured by applying a reflective coating to a suitable substrate. Glass can be a desirable substrate due to transparency, ease of fabrication, rigidity, and ability to take a smooth finish. Plastic or other materials can also be used. The reflective coating is typically applied to the back surface of the glass to protect the coating from corrosion and accidental damage. After a mirror substrate has been formed in a mold, or after the mirror substrate is shaped, the substrate can be polished and cleaned, and then coated with the reflective coating.

The mirror can be coated with a non-toxic silver or aluminum coating, or other coating. In one aspect, the coating may comprise a series of coatings. In one example, the coating can include a plurality of layers. For example, a first layer may be Tin(II) chloride. Tin(II) chloride can be applied because silver will not bond with the glass. Silver can then be applied. A Chemical activator can then be used to cause the tin and/or the silver to harden. Copper can be added for long term durability and paint can be added to protect the coating(s) on the mirror from scratches or other damage.

In some applications, the mirror can be made from a polished metal as described above. In some applications, the reflective coating can be applied by vacuum deposition on the front surface of the substrate, which can eliminate double reflections (a weak reflection from the surface of the glass, and a stronger one from the reflecting metal) and reduce absorption of light by the mirror. Varying materials can be used in forming the reflective coating to achieve varying degrees of reflectiveness. Protective transparent overcoats can be used to prevent oxidation of the reflective layers. Also, for higher reflectivity or greater durability dielectric coatings can be used to achieve reflectivities as high as 99.999% over a narrow range of wavelengths.

Various other optical devices other than mirrors can be improved by implementing surface contours determined according to surface normal calculations as described herein.

Some advantages of using the proposed computed freeform mirror instead of a set of wide angle projection lenses (i.e., traditional short throw lenses) can include the following, among others:

(a) Structural simplicity: freeform mirrors can correct aberrations using fewer elements than was previously possible with conventional spherical lenses. This can lead to systems with reduced size, weight, and complexity; and fewer alignment requirements and shorter assembly times;

(b) More design freedom: one advantage of freeform mirror design is the ability to specify the surface profile at each (and every) field point. Traditional spherical optics lack such an advantage since designs are constrained to a rotationally symmetric surface profile. The freeform design allows for skewed angle projection, short standoff distance projection, and correction of keystone distortions and other aberrations.

(c) Free of chromatic distortions: In all-lens optical systems, chromatic aberration seriously affects display performance because a lens may not focus all colors to the same point. (This is due to the different refractive indices of the lens for different wavelengths of light). Reflective mirrors do not exhibit this chromatic aberration: the reflective indices remain the same in visible and infrared spectrum.

(d) Robustness: Freeform mirror designs enable optical systems that are less susceptible to tolerance variations that can affect display performance.

The methods and systems of certain embodiments may be implemented in hardware, software, firmware, or combinations thereof. In one embodiment, the method can be executed by software or firmware that is stored in a memory and that is executed by a suitable instruction execution system. If implemented in hardware, as in an alternative embodiment, the method can be implemented with any suitable technology that is well known in the art.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

Also within the scope of an embodiment is the implementation of a program or code that can be stored in a machine-readable medium to permit a computer to perform any of the methods described above.

Additionally, the signal arrows in the Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Various functions, names, or other parameters shown in the drawings and discussed in the text have been given particular names for purposes of identification. However, the functions, names, or other parameters are only provided as some possible examples to identify the functions, variables, or other parameters. Other function names, parameter names, etc. may be used to identify the functions, or parameters shown in the drawings and discussed in the text.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A freeform optical device, comprising an at least partially curved surface having a surface geometry, wherein surface normals at a plurality of locations on the surface geometry are computed to define the surface geometry with respect to a plurality of focal points corresponding to the surface normals at the plurality of locations in order to correct optical aberrations otherwise occurring at the plurality of focal points.

2. An optical device as in claim 1, wherein the optical device comprises a mirror.

3. An optical device as in claim 1, wherein the optical device comprises a lens.

4. An ultra-short standoff image projection system comprising:
a display screen;
an image projector configured to project an image onto the screen, said projector having a freeform optical lens, the lens comprising an at least partially curved surface having a surface geometry, wherein surface normals at a plurality of locations on the surface geometry are computed to define the surface geometry with respect to a plurality of points on the screen corresponding to the surface normals at the plurality of locations to in order to correct optical aberrations otherwise occurring at the plurality of focal points.

5. A system as in claim 4, wherein the display screen has a diagonal dimension of at least 50 inches.

6. A system as in claim 4, wherein a distance between the projector and the display screen is less than approximately 0.4 meters.

7. A system as in claim 4, wherein a distance between the projector and the display screen is less than approximately 0.2 meters.

8. A system as in claim 4, wherein a projection angle is an oblique angle with respect to the display screen.

9. An ultra-short standoff image projection system comprising:
a display screen;
an image projector configured to project image data; and
a computed freeform mirror for reflecting image data from the projector onto the screen, the freeform mirror comprising an at least partially curved surface having a surface geometry, wherein surface normals at a plurality of locations on the surface geometry are computed to define the surface geometry with respect to a plurality of points on the screen corresponding to the surface normals at the plurality of locations in order to correct optical aberrations otherwise occurring at the plurality of focal points.

10. A system as in claim 9, wherein the display screen has a diagonal dimension or at least 50 inches.

11. A system as in claim 9, wherein a distance from the projector to the mirror to the screen is less than approximately 0.4 meters.

12. A system as in claim 9, wherein a projection angle is an off-axis oblique angle with respect to the display screen.

13. A system as in claim 9, wherein the system comprises a rear projection television.

14. A system as in claim 9, wherein a back of the projector is substantially aligned with the display screen.

15. A system as in claim 9, wherein the mirror is shaped to map the image data to the screen by inverting the image horizontally, vertically, or horizontally and vertically.

16. A process for projecting a short standoff image comprising the steps of:
establishing a distance relationship between a display screen and a computed freeform optical device;
positioning the computed freeform optical device for passing image data from an image projector onto the display screen, the freeform optical device comprising an at least partially curved surface having a surface geometry, wherein surface normals at a plurality of locations on the surface geometry are computed to define the surface geometry with respect to a plurality of points on the screen corresponding to the surface normals at the plurality of locations in order to correct optical aberrations otherwise occurring at the plurality of focal points; and
projecting the image onto the screen via the freeform optical device using the image projector.

17. The process claim 16, wherein positioning the projector comprises positioning the projector at a highly skewed angle of at least 70° relative to a selected edge of the display screen.

18. The process of claim 16, wherein a standoff distance of the projector to the display screen via the freeform optical device is less than approximately 0.4 m.

19. The process of claim 16, wherein the computed freeform optical device comprises a mirror for reflecting image data from the projector onto the display screen.

20. The process of claim 16, wherein the computed freeform optical device comprises a lens for transmitting image data from the projector onto the display screen.

* * * * *